No. 640,792. Patented Jan. 9, 1900.
A. H. MUNSELL.
COLOR SPHERE AND MOUNT.
(Application filed Apr. 14, 1899.)

(No Model.)

Witnesses:
Juliet E. Munsell
Margarette Palim

Inventor:
Albert H. Munsell.

THE NORRIS PETERS CO., PHOTO-LITHO., WASHINGTON, D. C.

UNITED STATES PATENT OFFICE.

ALBERT H. MUNSELL, OF BROOKLINE, MASSACHUSETTS.

COLOR-SPHERE AND MOUNT.

SPECIFICATION forming part of Letters Patent No. 640,792, dated January 9, 1900.

Application filed April 14, 1899. Serial No. 713,023. (No model.)

*To all whom it may concern:*

Be it known that I, ALBERT H. MUNSELL, a citizen of the United States, residing at Brookline, in the county of Norfolk and State of Massachusetts, have invented a new and useful Device for the Study and Arrangement of Colors, of which the following is a specification.

My invention relates, first, to the arrangement of colors upon a sphere so as to present the gradation of each color from light to dark; second, the placing of six equidistant colors of the solar spectrum around the equator of a sphere, with regular gradation to white at one pole and of similar gradation to black at the opposite pole; third, the mounting of such color-sphere so that it may be rotated upon the extremities of any desired axis, and, fourth, the combination of such color-sphere with a mirror so placed as to present simultaneously to the eye the visible and invisible portions of its surface. I attain these ends by means of the device illustrated in the accompanying drawings.

Figure 1:
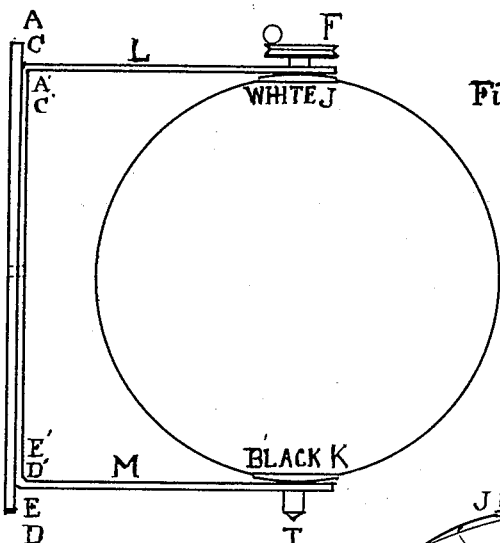
Figure 2:
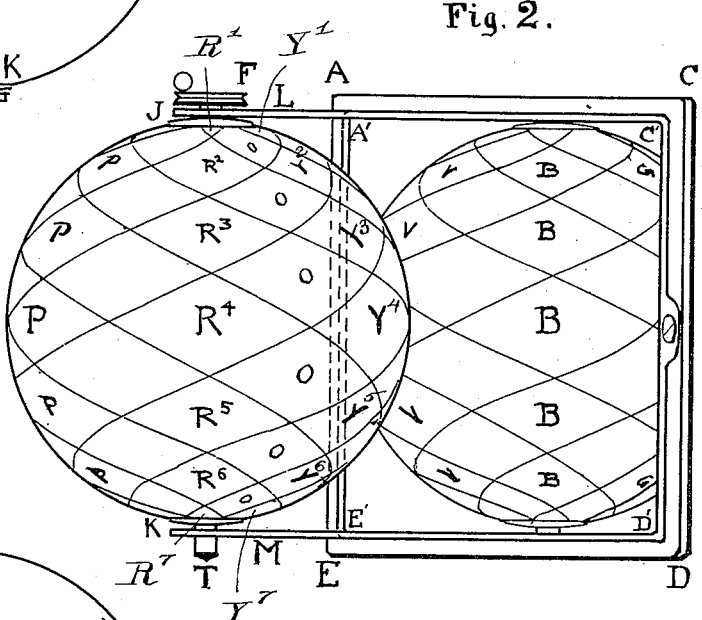
Figure 3:
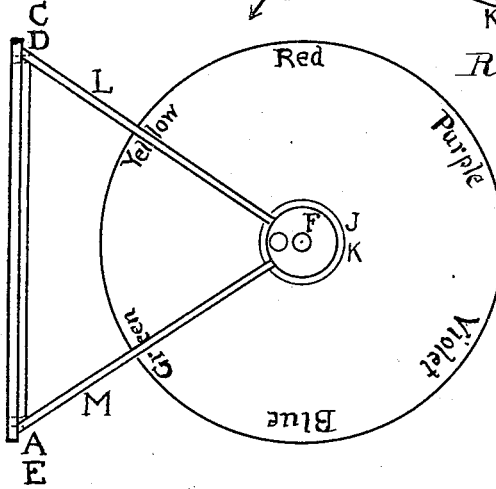

Figure 1 is a side elevation. Fig. 3 is a plan. Fig. 2 is an oblique view in the direction of the arrow S to show the mirror which serves to make visible the farther side of the sphere.

Similar letters refer to similar parts throughout the several views.

A globe or sphere is held between two slightly-hollowed disks or friction-chucks J K, having small pin-points for additional security, and these disks J K are free to revolve in a metal support L M, secured to a mirror-frame A C D E, holding a mirror A' C' D' E'. Any rate of revolution is given to the sphere by means of the hand or by power imparted to the pulley F. The device may be placed with the mirror horizontal or stand on the edge E D and the pivot T.

The colors are arranged as follows: Six equidistant colors of the solar spectrum—red, yellow, green, blue, violet, and purple—are placed around the equatorial surface and then graded to white at the north (or uppermost) pole and to black at the opposite pole. Thus $R'$ $R^2$ $R^3$ $R^4$ $R^5$ $R^6$ $R^7$ represent all gradations or "values" of red from white to black. $Y'$ $Y^2$ $Y^3$ $Y^4$ $Y^5$ $Y^6$ $Y^7$ represent all values of yellow, and the intermediate space will present similar gradations of the intermediate color—orange.

The object of my invention is to provide a spherical color-chart for educational purposes. It is necessary or desirable in the study of colors to the best advantage to be able to present a sequence of colors as they exist in nature and to present to the eye an orderly arrangement of colors in a great variety of sequences. For instance, it is important to have a sequence of colors as they are found related in the spectrum and to have such a sequence in every value or gradation of colors and to have a sequence changing not only in color, but in value, at each successive stage. It is highly essential to have such sequences collected together in a single chart and closely related for convenience of comparison and easy reference. There is no other form than a sphere upon the surface of which the chart can be spread to accomplish all of the required objects. In the first place there is displayed at the equator the spectrum colors of middle value in their natural order and forming an unbroken band, so that a continuous sequence is found in starting with either color. Above the equator are the spectral bands of successively lighter value which exhibit the same features of an unbroken sequence and the same advantages as in the first. Likewise of the spectral bands of successively darker values below the equator. This arrangement of the spectral bands upon the parallels of the sphere results in a color sequence never heretofore arranged upon a chart and of especial value and interest to the student and artist because of its almost universal existence in nature. Beginning at white at the north pole and traversing in a spiral path to the south pole through the intersections of the meridians and parallels a color sequence is found varying both in color and value at each successive step in the course, which spiral, continued in the same manner upon the other side of the sphere, will pass through an opposite sequence back to white. Many such spiral color sequences may be traced on the chart. The sequence being an unbroken course around the sphere, it may be started at any point and continued through two or more steps, as desired, and an endless variety of combinations may be obtained. The employment of the mirror enables the student to see complementary groups of colors and to complete any sequence at a glance. The ability to mathematically indicate the location of any point or series of points upon the surface of a sphere enables one by means of my chart to communicate in writing a precise color sequence which language is otherwise wholly inadequate to do. The pupil is also able to verify or correct his recollection of color sequences observed in nature under conditions where it is inconvenient at the moment of observation to reproduce them and to find suggestions of the true sequences of color for which he is seeking. I am aware that spheres with variegated-colored surfaces have been made for the purposes of amusement; but these colors have not been arranged in any scientific order. My invention is limited to the precise arrangement shown and described and for a distinctly-different purpose. A special surface thus arranged suggests all color sequences and values at a glance, while the mirror presents simultaneously the opposite or complementary fields of color. If the sphere be revolved in this position, it presents a series of spectral bands about the neutral axis from white to black. If the sphere be removed from the disks J K and replaced on any other axis, it may be made to present a series perpendicular to the axis joining any two chosen opposite colors or color-poles.

The rate of revolution will determine the merging and predominance of the colors.

Having now particularly described and ascertained the nature of my invention and in what manner the same is to be employed, I declare that what I claim is—

1. A color-sphere having displayed equatorially thereon the dominant colors of the spectrum, with intermediate series of said colors graduated therefrom toward the poles, to white and black respectively, and a complete color sequence between lightest and darkest value of any given color passing from one to the other pole of the sphere in a spiral path through all the dominant colors displayed.

2. A sphere displaying all gradations of color from white to black, and a mount arranged to suspend a color-sphere so that it may be revolved on any chosen axis before the surface of a mirror, in combination with a mirror, all constructed and operating substantially as specified.

In testimony whereof I have signed my name to this specification in the presence of two subscribing witnesses.

ALBERT H. MUNSELL.

Witnesses:
   JOHN C. EDWARDS,
   A. E. DEAN.